May 23, 1961 J. L. GILMORE 2,985,089
LOUVER AND METHOD OF MANUFACTURE
Filed July 25, 1958 3 Sheets-Sheet 3

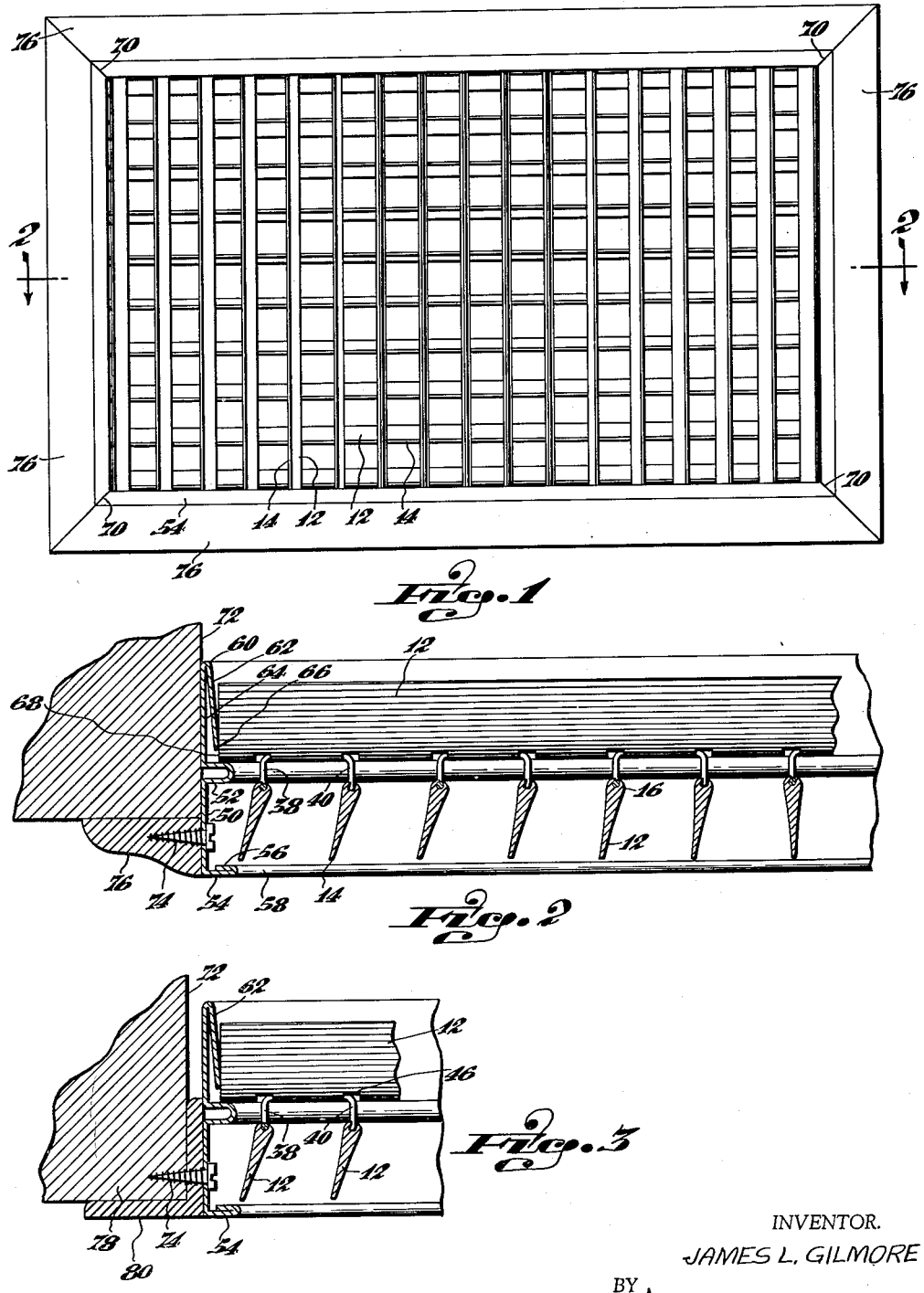
May 23, 1961      J. L. GILMORE      2,985,089
LOUVER AND METHOD OF MANUFACTURE
Filed July 25, 1958      3 Sheets-Sheet 1
INVENTOR.
JAMES L. GILMORE

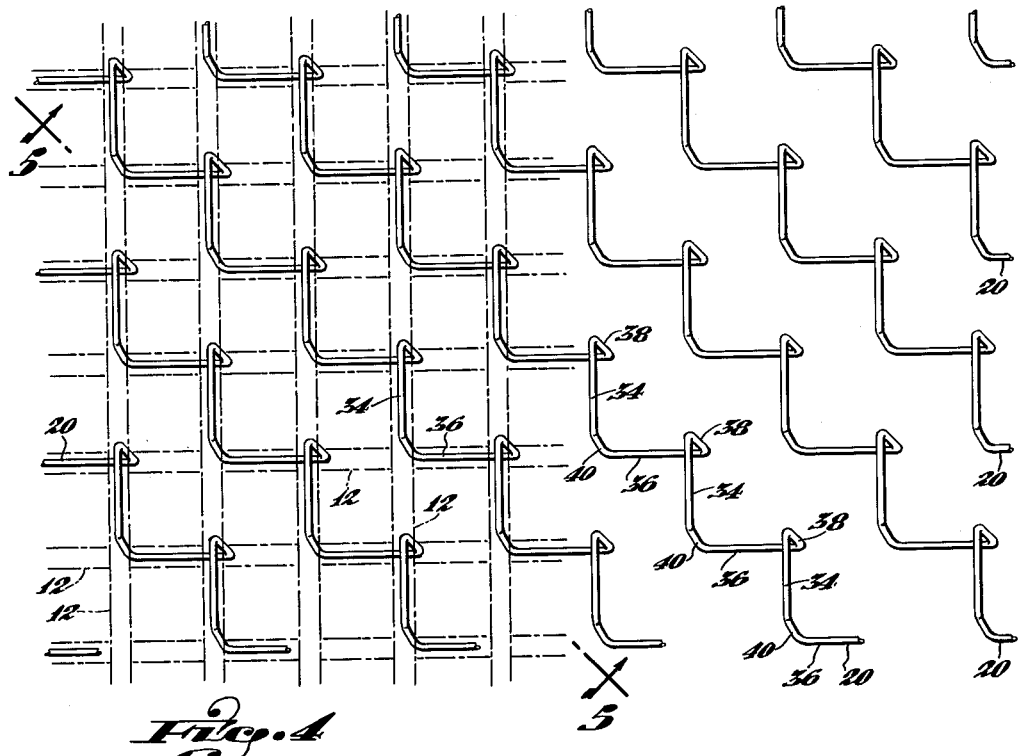
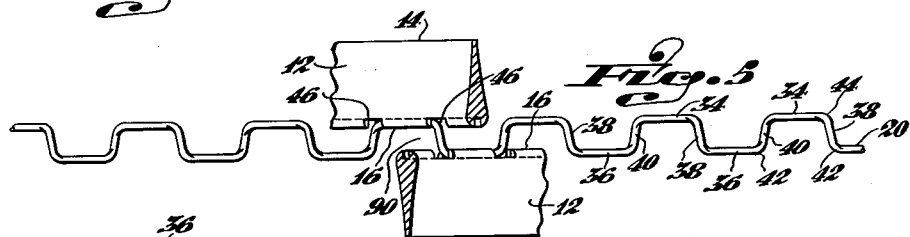
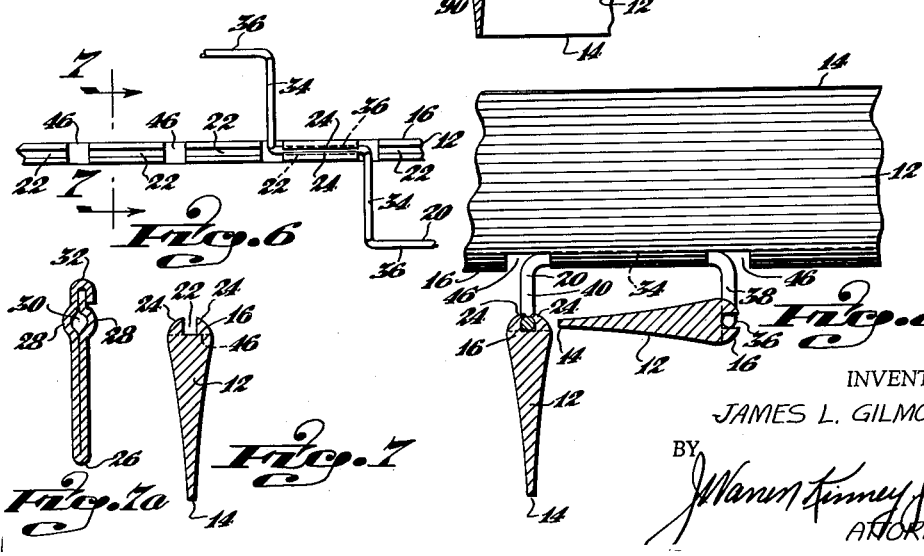
INVENTOR.
JAMES L. GILMORE

INVENTOR.
JAMES L. GILMORE
BY
J. Warren Kinney
ATTORNEY.

United States Patent Office 2,985,089
Patented May 23, 1961

2,985,089

LOUVER AND METHOD OF MANUFACTURE

James L. Gilmore, 230 56th Ave., S., St. Petersburg, Fla.

Filed July 25, 1958, Ser. No. 751,008

13 Claims. (Cl. 98—40)

This invention relates to a louver or grille assembly, and a method of manufacture thereof. Louvers or grilles produced in accordance with the present invention are adjustable for the control or direction of gases or other fluids moving through a duct or plenum, and may be used also as an adjustable screen to control the transmission of light or other forms of radiant energy.

An object of the invention is to provide a unique form of louver comprising a multiplicity of adjustable vanes mounted and assembled in a novel manner, to gain advantages in fabrication and ultimate application.

Another object of the invention is to provide a form of louver which may be manufactured, sold, and shipped as a frameless slab or basic unit of such proportions, from which a number of smaller, individual sub-units or sections constituting smaller but complete louvers dimensioned as required for a given installation, may be cut.

A further object is to provide improved framing and mounting means for an individual louver of the character referred to, whereby the louver may be quickly and easily mounted at the delivery port of a duct, and restrained against displacement and possible vibration resulting in noise or rattle.

Additionally, it is an object of the invention to provide a new method of fabricating a louver or grille having the characteristics stated, which method greatly minimizes expensive handwork in assembly, and lends itself to automatic machine production as a continuous process.

The foregoing and other objects are attained by the means described herein and illustrated upon the accompanying drawings, in which:

Fig. 1 is a front elevational view of an individual grille or louver embodying the invention, shown framed and having its horizontal and vertical vanes disposed at various angles for controlling and directing a flow of air or other fluid passing therethrough.

Fig. 2 is a cross-sectional view on an enlarged scale, taken on line 2—2 of Fig. 1, illustrating a detail of the louver mounting means.

Fig. 3 is a view similar to Fig. 2, showing a modification of the mounting means.

Fig. 4 is a diagrammatical plan view illustrating the method of assembly of the louver constituents in accordance with the present invention.

Fig. 5 is a cross-sectional view taken on line 5—5 of Fig. 4, showing the relationship of the vanes to one another and to the spines which support them.

Fig. 6 is a fragmentary plan view showing a single vane and its mode of attachment to a spine.

Fig. 7 is an enlarged cross-sectional view taken transversely through a vane, on line 7—7 of Fig. 6.

Fig. 7a is a view similar to Fig. 7, showing a modified form of vane.

Fig. 8 is a fragmentary enlarged cross-sectional view similar to Fig. 3, with framework omitted.

Figure 9:
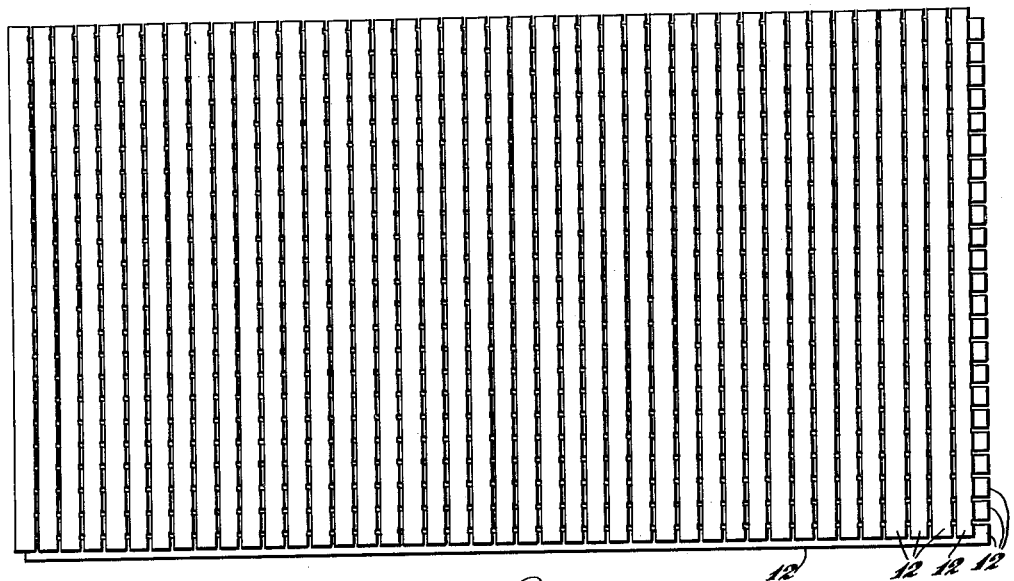
Fig. 9 is a top plan view of the louver assembly in large frameless slab or basic unit form, showing all the vanes disposed in the closed position for shipment and storage.

According to the present invention, any number of preformed vanes of any length may be assembled upon a series of formed wires or spines, to produce a basic unit or slab of louvers indeterminate as to size, as depicted in Fig. 9. Such a slab can be quickly assembled by hand or by means of an automatic machine, not herein to be disclosed, and may be shipped and stored as an unframed slab from which may be severed a number of smaller, individual sections or sub-units as suggested by Fig. 10, sized to fit a given duct installation. Such individual sections dimensioned to satisfy a particular duct requirement may be cut from the slab on the job, if desired, by means of a saw, shear, or other cutting instrument, and when so cut out, the section is intact and ready for framing into the duct.

The basic louver unit or slab comprises a multiplicity of identical vanes and a multiplicity of identical spines, the vanes and spines being the only two parts to be manufactured and used in producing the lower slab, which is characterized by the complete absence of small fasteners, brackets, studs or other parts difficult to handle and assemble.

The vanes are in the form of long narrow strips or slats, herein designated by the character 12. Each vane may be formed of rolled, stamped, or extruded metal, for example, aluminum, and has a free longitudinal leading or forward edge 14 in parallelism with a trailing, base, rear, or mounting edge 16 adapted for hinged application to a spine designated 20, so that the vanes may be selectively and individually disposed angularly to one another as illustrated by Figs. 1, 2 and 8. The hinge connections for the vanes preferably are made snug or reasonably tight to ensure retention of any position of angular adjustment established by the installer.

The spine by preference is a wire or rod to which is imparted a particular configuration as will be explained. Hinging the vanes upon the spines of wire or rod stock may be accomplished in various ways, two examples of which are illustrated in the drawings. Referring to Figs. 6 and 7, it is noted that the base edge 16 of a vane may be provided with a longitudinal groove or seat 22 receptive of the wire and defined by longitudinal lips 24—24 to be bent inwardly over the wire as shown at the left of Fig. 8, to confine and snugly retain the wire within the groove or seat, while permitting movement of the vane to adjusted positions about the wire.

A single lip 24, of course, might be depended upon to confine the wire of the spine, if desired.

As will be understood, the lip or lips 24 may be turned, bent, or otherwise formed over by means of a swaging, peening or rolling operation performed simultaneously or progressively upon a multiplicity of vanes initially assembled loosely upon the wires constituting the spines. In the example illustrated by Fig. 7, the groove or seat 22 is formed in the base edge of the vane, parallel to the free edge 14 thereof, and upon the mean plane of the vane. The groove might, of course, be formed in a side of the vane near the base edge, with satisfactory results. The cross-sectional shape of the groove may be otherwise than shown in the drawing illustrations.

In accordance with the variation illustrated by the example of Fig. 7a, the vane may be formed of flat stock in strip form, turned upon itself longitudinally at 26 to provide a free edge comparable to edge 14, and having its mounting edge portion provided with outwardly extended ribs 28—28 to establish a longitudinal seat or channel 30 receptive of the wire of the spine. A lock which may be in the form of a crimp 32, may serve to snugly retain the wire within the channel or seat 30. The construction above described is, of course, subject to considerable modification within the skill of the mechanic or producer, wherefore the invention is not to be limited to the exemplary structure illustrated, either by Fig. 7a, or Fig. 7.

The spine 20, of which many are used in producing a slab such as Fig. 9 discloses, is preferably formed of a single length of stiff wire subject to forming in an automatic machine. To most clearly explain the shape of the spine, one may assume its formation upon a mandrel of rectangular bar stock whose thickness is about one-third its width, and about which a length of wire is wound to produce a series of widely spaced convolutions resembling a long helical spring. The convolution sections lying upon one major face of the mandrel are disposed at 45 degrees to the mandrel axis, and in parallelism with one another. Likewise, the convolution sections lying upon the opposite face of the mandrel are parallel to one another and disposed at 45 degrees angularity to the mandrel axis. This, of course, results in a 90 degree angularity of one convolution section relative to the one next adjacent thereto, as indicated upon Fig. 4, at 34 and 36, producing a Z-formation.

All of the major convolution sections 34 are parallel and are in a single plane, and all of the major convolution sections 36 are parallel and are disposed in another plane which is parallel to and spaced from said single plane. The distance between such planes is established by the minor connecting portions 38 and 40, which are equal in length as determined by the uniform thickness of the mandrel.

The major convolution sections 34 and 36 may be hereafter referred to as the vane mounting or supporting sections of the spine, while the shorter minor sections 38 and 40 may properly be regarded as the spacer sections thereof. The spacer sections 38 and 40 may be arranged, as nearly as is practicable, to meet the vane mounting sections at approximate right angles; however, if this angularity is somewhat greater than a right angle as the drawing indicates at 42 and 44, Fig. 5, no interference with the proper assembly and operativeness of the structure is experienced. Also, as nearly as in practicable, the spacer sections 38 and 40 should be parallel to one another, with some deviation permissible in actual practice. The spacer sections at opposite ends of any given vane mounting section, are of equal length by preference, and establish the overall width and thickness of the spine member.

In order to provide for mounting of the vanes upon the spines in accordance with the present invention, each vane is to be transversely notched across the base edge thereof at intervals, as indicated at 46, to provide clearance for the spacer sections when the vanes are tilted to parallelism with the mean plane of the spine, as shown at the right of Fig. 8. The horizontally disposed vane 12 of Fig. 8 obviously may be swung in counter-clockwise direction about the mounting section 36 of the spine, through an arc of about 180 degrees. This particular vane is shown in the closed louver position; the vane at the left in Fig. 8 is in the open louver position.

The transverse notches 46 exceed in length the diameter of the spine wire, and the distance between adjacent notches 46 is slightly less than the length of a vane mounting section 34 or 36 of the spine, so the vane head may hingedly accommodate such section (Fig. 6).

From the disclosure of Fig. 5, it will readily be evident that the upper and lower vanes 12, 12 are extended in opposite directions from the spine 20 to establish an open-louver condition. If the louver is to be closed to the maximum extent possible, these vanes would be each turned about their respective hinges or spine mounting sections through an arc of 90 degrees, thereby to dispose the mean planes of the vanes in parallelism. Thus, the louver would resemble Fig. 9 in plan, and would form a slab of limited thickness.

To assemble a louver with the use of vanes and spines as above described, reference may be had to Fig. 6, wherein is shown the vane 12 of indeterminate length standing upon its full edge with the groove or seat 22 uppermost. Into one of the grooves is laid a mounting section 36 of the wire spine. Then the lips of the groove may be turned upon the wire section 36 by rolling, swaging, or pressing the lips inwardly, to effect a snug hinge connection between the parts. Thereupon another spine is placed, parallel to the first spine, with a mounting section 36 similarly fitted to and secured within the next adjacent groove 22 of the vane, so that the vane will carry two spines extending generally across the vane at an angle of 45 degrees. The application of spines to the single vane as above described is repeated and continued until every groove 22 of the vane is attached to a spine section 36, with all the spines extending generally across the vane at an angle of 45 degrees. The multiplicity of spines will be thereby arranged as suggested by Fig. 4, with all the mounting sections 36 disposed in one plane, while all the remaining mounting sections 34 are disposed in another plane parallel to and spaced from the first plane a distance determined by the spacer sections 38 and 40 of each spine.

In assembling the structure as above described, the mounting sections 36 of the spines are so selected for attachment to the various vane grooves, as to result in ends of the mounted spines forming a rectangle. In the completed structure an empty vane groove 22 is alternately disposed between adjoining or adjacent grooves which are secured to the corresponding portion of the mounting section next to the one that corresponds to the previously attached mounting section. Thus, in Fig. 4, the upper ends of the spines shown at the head of the drawing sheet may be considered located at the upper edge of Fig. 9. The spines, if shown upon Fig. 9, would extend diagonally of the sheet precisely as indicated upon Fig. 4.

To proceed with explanation of the louver assembly, after all of the spines are attached to the single vane 12 of Fig. 6 so that the spines extend diagonally as in Fig. 4, the next step is to arrange additional vanes parallel to the vane 12 and secure them to all the remaining rows of spine sections 36, without regard to the alternate mounting sections 34. After all the vanes are so attached to the sections 36, the result will be a rectangular grille having a multiplicity of similar vanes all extending in spaced parallelism to one another in much the same manner as is shown in the lower half of Fig. 2. If desired, the resulting grills or louver comprising vanes extending only in one direction, could be considered a completed structure having utility for certain applications.

Figure 10:
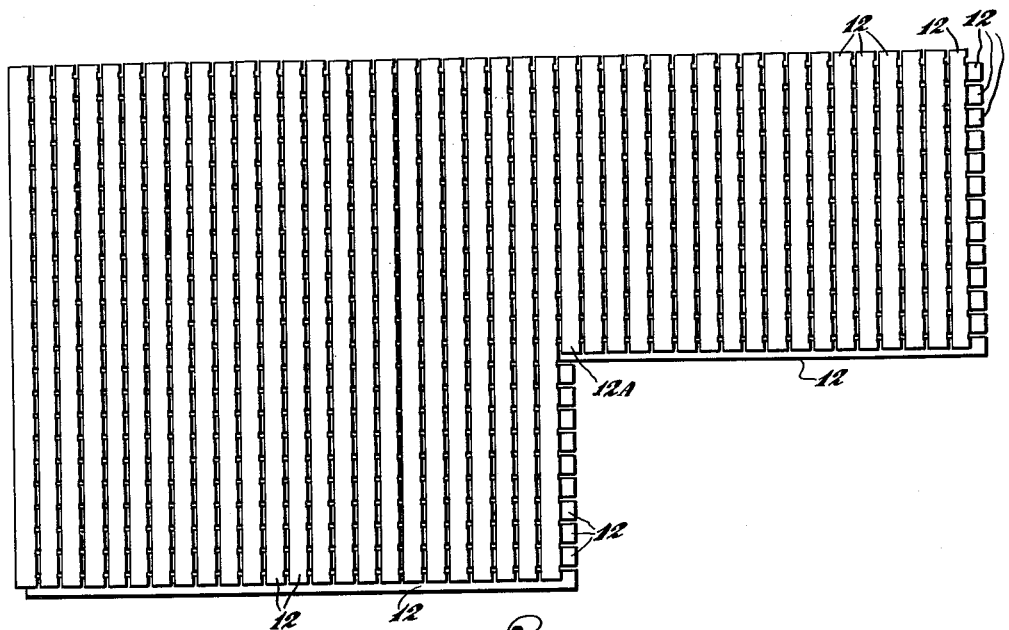
Fig. 10 is a view similar to Fig. 9, showing a rectangular section or sub-unit removed from one corner of the basic unit, the removed section being cut out to fit a particular duct to be louvered.

It is preferable to furnish the louver assembly above described with a second set of vanes, the second set extending transversely of the first set as indicated upon Figs. 5, 8 and 9. Thus, the rows of vanes 12 extending vertically in Fig. 9, are preferably at right angles to the rows of horizontal vanes there shown. The second set of vanes is to be mounted upon the mounting sections 34 of the spine members in the manner previously explained, that is, by registering the grooves 22 of the vanes with a number of aligned spine sections 34, and then closing the groove lips 24 thereon to effect the connection. The resulting structure will then be as depicted by Figs. 9 and 10, comprising rows of vanes extending lengthwise of the slab, and other rows of vanes extending crosswise thereof. The same is shown also in Figs. 1, 2, 5 and 8, and by means of broken lines in Fig. 4.

As is evident, the two sets of vanes are extendable from the spine member in opposite directions from the mean plane of the spine member. Also, the vanes of both sets may be folded over into parallel planes, to form the slab of Fig. 9 wherein both faces of the slab are substantially planar and solid.

It may here be pointed out, in connection with Figs. 9 and 10, that the basic unit or slab of Fig. 9 may be cut to remove a louver section as suggested in Fig. 10, by simply sawing or shearing the desired section from the slab. The preferred procedure is to lay out on the flattened slab the size and shape of a required individual louver. The mechanic then would raise or extend those vanes which are on and parallel to his intended line of cut, to avoid shearing or sawing any vane in the direction of its length. With the slab so pre-conditioned for severance, the mechanic may easily saw or shear from the slab any section he might require, and the section so removed will be intact and ready for use in finishing a duct port. The remainder of the basic unit or slab ordinarily will be sufficiently large to provide a number of individual louvers which the mechanic might cut out to satisfy specific job requirements.

Under the plan above described, manufacture of the louver in slab form is rapid and inexpensive, and shipping and storage costs are reduced to a minimum. The distributor or supplier gains the advantage of saving storage space by eliminating a large inventory of different louver sizes, for as above explained, he is able to supply any size or shape of louver by simply cutting it from a slab as ordered. The supplier may also carry in stock a suitable framing element in strip form, as will be described hereinafter, and which may likewise be cut off to proper size for framing and mounting any size of louver severed from the slab.

The framing and mounting element for a louver is best shown upon Figs. 2 and 3. It may be produced as a long strip, to be cut off in proper lengths to frame any given louver, and this may be done on the job if desired. The framing and mounting strip is indicated generally by the character 50, and may be produced from an initial long flat strip of metal pressed or otherwise shaped to the cross-section illustrated.

The strip forming the framing and mounting element may be provided with a longitudinal extending rib 52 running lengthwise of the strip, and located about half way between the parallel side edges of the strip. One side edge may be turned in the direction of extension of the rib to provide a face flange 54 disposed approximately at right angles to the body of the strip, and this face flange may be finished by turning inwardly thereon a bead or lip 56 producing a finished smooth edge 58.

At the opposite side edge, the strip may be bent at 60 to furnish an apron 62 of considerable width, projecting toward the rib 52 and arranged to overlie the inner face 64 of the strip body in spaced relation thereto. The apron is disposed at an acute angle to the face 64, and has a free edge 66 adapted to abut the adjacent ends 68 of those vanes 12 which meet the apron at approximate right angles. The purpose of the apron is to provide restraining means abutting the vanes 12 at 66, to aid in maintaining their angular adjustment and prevent possible vibration or rattling of the vanes as air or other fluid passes between them. The natural resiliency of the metal constituting the apron serves to hold the apron firmly against the ends of the vanes.

In practice, long strips formed as above described may be taken to the duct job and cut off at proper lengths to circumscribe the particular louver to be framed and mounted. In establishing the required lengths, miter cuts may be employed to produce mitered corners at the locations 70, thereby to achieve a neat framing assembly about the louver. Upon fitting the strips to the sides and ends of the louver, the whole may be slid bodily into a duct opening 72 wherein it may be secured by means of screws 74 or other suitable fasteners passing through the body of each strip 50 and anchoring in the material forming the duct opening. The screws or fasteners 74 may be anchored in a peripheral molding strip 76 as suggested by Fig. 2, or as shown in Fig. 3 they may anchor in a duct framing member such as 78. If the duct port should on a particular job be formed of sheet metal, the screws may be replaced by small bolts or the like, securing the mounting strips 50 directly thereto.

The nature of the duct opening in particular cases may determine the method of attachment for the framing and mounting elements. As shown in Fig. 3, angular duct frames 80 may be interposed between the duct opening and the mounting strips for the louvers, if desired. The method of attachment is, of course, subject to variations within the judgment and skill of the mechanic in meeting the requirements of a particular installation.

The framing and mounting strips 50 preferably are so formed that rib 52 will occupy the space between the upper or inner and lower or outer sets of louvers, which space is determined largely by the length of the minor spine sections or spacers 38 and 40. The fitting of the rib into the space mentioned (space 90 of Fig. 5), may be snug if desired, to assist in holding the framing and mounting strip during assembly thereof upon the louver. It is desirable also that the flange 54 be of sufficient width to conceal any rough edges formed on the vane ends resulting from severance of the louver from the slab of Fig. 9.

The space between flange 54 and the rib 52 should slightly exceed the width of the vanes so that when the vanes are extended as shown in Fig. 2, their free edges 14 will remain within the confines of the frame. Also, with respect to the upper set of vanes 12 in Fig. 2, the distance from rib 52 to the apron base at 60 should preferably exceed the width of a vane, so that the vanes when extended as in Fig. 2 will be disposed within the confines of the frame 50.

It is to be understood that the louver assembly of Fig. 9 might be manufactured in a simplified form, by omitting all the vanes at one face of the slab. That is, the vanes 12 of the upper set in Fig. 2, for example, could be omitted from the assembly. The vanes themselves may be of the air foil design as shown, or may in some cases be provided in various other cross-sectional shapes. It is to be understood that I do not intend to limit the invention to the present disclosure, but aim to cover all modifications and alternative constructions falling within the spirit and scope of the appended claims, since the invention is susceptible to various modifications and changes in structural details.

What is claimed is:

1. In a louver assembly, the combination of vanes in elongate strip form, each having a free edge and a base edge in substantial parallelism, said base edge having formed adjacent thereto a longitudinal groove interrupted at intervals along the length of said base edge forming spaced transverse notches, and mounting spines for the vanes extending across the vanes and each comprising a wire having sections embedded and secured within the grooves of crossing vanes at locations intermediate the notches.

2. As a new article of manufacture, a louver vane comprising an elongate substantially rigid strip having opposite ends, a longitudinal free edge, and a base edge in substantial parallelism with said free edge, the base edge being relatively thicker than the free edge and grooved longitudinally in parallelism with the free edge to receive a hinge element, the grooved base edge being transversely channeled at intervals along the length of the strip, to a depth approximating the depth of the longitudinal groove.

3. A louver assembly in unframed slab form, comprising a plurality of elongate spine members disposed substantially parallel to one another, each spine member including successive vane mounting portions and offset interconnecting portions, alternate vane mounting portions forming a series of first parallel sections angularly disposed from intervening second parallel sections, and a plurality of vanes each pivotally supported upon the vane mounting sections of the spine members and producing the slab form.

4. In a louver assembly, the combination of a multiplicity of vanes in elongate strip form, each having a free edge and a base edge in substantial parellelism, a plurality of elongate wire mounting spines for the vanes each comprising a series of alternate horizontal vane mounting portions and offset interconnecting portions with the vane mounting portions being disposed substantially parallel to one another, the plurality of spines being disposed substantially parallel to one another and spaced across the vanes, and means hingedly mounting the base edges of the vanes upon the spines across which they extend for disposing all the vanes in substantial relative parallelism.

5. In a louver assembly, the combination of a multiplicity of vanes in elongate strip form, each having a free edge and a base edge in substantial parallelism, a plurality of elongate wire mounting spines for the vanes each comprising a series of alternate vane mounting portions and offset interconnecting portions with certain of the vane mounting portions disposed parallel to one another in a plane alternating with the remaining portions which are disposed in parallelism in a plane offset but parallel to the plane first mentioned, the plurality of spines being disposed substantially parallel to one another and spaced across the vanes, means mounting one group of vanes with the base edges thereof hinged to those vane mounting portions which rest in one plane, and means hingedly mounting the base edges of a second group of vanes upon those vane mounting portions which are disposed in the offset plane aforesaid.

6. A louver assembly comprising in combination, a plurality of strip-like vanes each having a free edge, a base edge, and opposite ends, a series of elongate spaced parallel spine elements each including vane-supporting sections separated by offset interconnecting sections and disposed at opposite sides of a plane which is parallel with and bisects the interconnecting sections, means pivoting the base edge of each vane of a group of vanes upon the supporting sections of a number of spines, the supporting sections located at one side of the plane bisecting the spine elements, a circumferential sectional frame confining the vanes and the spine elements thereto attached, and resilient means on the frame abutting the ends of the vanes to resist pivotal movement of the vanes from adjusted positions on the supporting sections.

7. The device as set forth in claim 6, wherein is included a second group of said strip-like vanes with means pivoting each of the latter upon supporting sections of a number of the spine elements at the opposite side of the bisecting plane thereof, the vanes of the second group having their base edges uniformly spaced from the base edges of the first-mentioned group of vanes, and an inwardly extending rib on the frame fitted into the space between the base edges of the two groups of vanes, for precluding displacement of the louver assembly laterally from the frame.

8. In a louver assembly, the combination of a multiplicity of vaies in elongate strip form, each having a free edge and a base edge in substantial parallelism, a series of elongate mounting spine members for the vanes, each spine member comprising a succession of short straight vane mounting sections separated by offset interconnecting sections, with alternate mounting sections coplanar and substantially parallel to one another, and the remaining mounting sections each disposed in a second plane offset but parallel to the plane first mentioned, means mounting a first group of vanes with the base edges thereof hinged to those vane mounting sections which rest in the plane first mentioned, means hingedly mounting the base edges of a second group of vanes upon those vane mounting sections which are disposed in the offset second plane, and a peripheral frame for mounting of the louver assembly within a duct port, said frame including an inwardly projecting circumferential retaining rib receptive between the base edges of the two groups of vanes.

9. The combination as set forth in claim 8, wherein the mounting frame includes resilient apron means in frictional contact with the vanes, to preclude displacement of the vanes from adjusted positions upon their respective vane mounting sections.

10. In a louver assembly, the combination of a multiplicity of vanes in elongate strip form, each having a free edge and a base edge in substantial parallelism, a series of elongate mounting spine members for the vanes, each spine member comprising a succession of short straight vane mounting sections separated by offset interconnecting sections, with alternate mounting sections coplanar and substantially parallel to one another, and the remaining mounting sections each disposed in a second plane offset but parallel to the first plane, said remaining sections being parallel to one another and at approximately right angles to the sections of the first plane, the spine members lying in spaced parallel relation and the said vane mounting sections of the members in each of said planes being aligned with a corresponding section of an adjacent spine member, means mounting a first group of vanes with the base edges thereof hinged to those aligned vane mounting sections which rest in the first plane, and means hingedly mounting the base edges of a second group of vanes upon those aligned vane mounting sections which are disposed in the offset second plane, the vanes of the first group being extendable in one direction laterally of the parallel planes aforesaid, and the vanes of the second group being laterally extendable in the opposite direction relative to said planes.

11. A louver assembly in unframed slab form, comprising a set of elongate parallel vanes and a series of elongate spines extending obliquely to the vanes, each of said spines including successive vane mounting sections and offset interconnecting sections, alternate vane mounting sections being coplanar and substantially parallel, the remaining vane mounting sections being coplanar and substantially parallel to one another and oblique to the alternate vane mounting sections, each of said vanes crossing a number of the obliquely extending spines, and means pivotally joining each vane with the mounting sections across which it extends for pivoting on an axis paralleling the vane, the said vane and spine assembly facilitating the severance therefrom of a smaller fully operative louver assembly.

12. A spine element of a louver assembly which includes a multiplicity of vanes, said spine element comprising a continuous wire embodying a series of vane supporting short sections separated by offset interconnecting sections, the interconnecting sections making an approximately helical formation, a number of said mounting sections lying at one side of the axis line of the helical formation alternating with mounting sections on the opposite side of such line, the mounting sections on each side of said line being substantially parallel to one another and in a common plane and each of said mounting sections being adapted to cooperate with a corresponding mounting section of another spine in the louver assembly for pivotally supporting a louver vane.

13. A spine for connection with a series of vanes in a louver assembly, said spine comprising an elongate member consisting of a first series of short vane mounting sections in spaced parallel relation and connected at their ends to ends of a second series of short spaced parallel vane mounting sections by perpendicularly extending spacer sections, said first series of sections lying in a common plane and spaced by the spacer sections from the second series of mounting sections, the second series of mounting sections being in a common plane and the mounting sections of one series being approximately perpendicular to the mounting sections of the other series.

References Cited in the file of this patent

UNITED STATES PATENTS

| | | |
|---|---|---|
| 2,145,073 | Drake | Jan. 24, 1939 |
| 2,293,065 | Kiczales | Aug. 18, 1942 |
| 2,319,225 | Grebe | May 18, 1943 |
| 2,325,458 | Witteman | July 27, 1943 |
| 2,395,319 | Davies | Feb. 19, 1946 |
| 2,500,330 | Stover | Mar. 14, 1950 |